(12) United States Patent
Whaley et al.

(10) Patent No.: US 10,601,786 B2
(45) Date of Patent: Mar. 24, 2020

(54) PRIVACY-PRESERVING SYSTEM FOR MACHINE-LEARNING TRAINING DATA

(71) Applicant: UnifyID, San Francisco, CA (US)

(72) Inventors: John C. Whaley, Fremont, CA (US); Eleftherios Ioannidis, Cambridge, MA (US)

(73) Assignee: UnifyID, San Francisco, CA (US)

( * ) Notice: Subject to any disclaimer, the term of this patent is extended or adjusted under 35 U.S.C. 154(b) by 274 days.

(21) Appl. No.: 15/910,812

(22) Filed: Mar. 2, 2018

(65) Prior Publication Data
US 2018/0255023 A1    Sep. 6, 2018

Related U.S. Application Data

(60) Provisional application No. 62/466,234, filed on Mar. 2, 2017.

(51) Int. Cl.
| | | |
|---|---|---|
| *G06F 21/00* | (2013.01) | |
| *H04L 29/06* | (2006.01) | |
| *H04L 9/30* | (2006.01) | |
| *H04L 9/08* | (2006.01) | |
| *G06N 20/00* | (2019.01) | |
| *G06F 15/76* | (2006.01) | |
| *H04L 9/32* | (2006.01) | |

(52) U.S. Cl.
CPC .......... *H04L 63/0421* (2013.01); *G06F 15/76* (2013.01); *G06N 20/00* (2019.01); *H04L 9/0819* (2013.01); *H04L 9/0825* (2013.01); *H04L 9/30* (2013.01); *H04L 9/3231* (2013.01); *H04L 2209/42* (2013.01)

(58) Field of Classification Search
CPC ........ G06N 20/00; G06N 3/08; G06N 3/0445; G06N 3/0454; G06N 7/005
See application file for complete search history.

*Primary Examiner* — Ghazal B Shehni
(74) *Attorney, Agent, or Firm* — Park, Vaughan, Fleming & Dowler LLP

(57) ABSTRACT

The disclosed embodiments relate to a system that anonymizes sensor data to facilitate machine-learning training operations without disclosing an associated user's identity. During operation, the system receives encrypted sensor data at a gateway server, wherein the encrypted sensor data includes a client identifier corresponding to an associated user or client device. Next, the system moves the encrypted sensor data into a secure enclave. The secure enclave then: decrypts the encrypted sensor data; replaces the client identifier with an anonymized identifier to produce anonymized sensor data; and communicates the anonymized sensor data to a machine-learning system. Finally, the machine-learning system: uses the anonymized sensor data to train a model to perform a recognition operation, and uses the trained model to perform the recognition operation on subsequently received sensor data.

31 Claims, 4 Drawing Sheets

PRIVACY-PRESERVING SYSTEM FOR MACHINE-LEARNING TRAINING DATA

CROSS-REFERENCE TO RELATED APPLICATION

This application claims the benefit of U.S. Provisional Application Ser. No. 62/466,234, entitled "Privacy Preserving System," by inventor John C. Whaley, filed on 2 Mar. 2017, the contents of which are incorporated by reference herein.

BACKGROUND

Field

The disclosed embodiments generally relate to techniques for preserving the privacy of data in computer systems. More specifically, the disclosed embodiments relate to a technique for anonymizing user-related sensor data to facilitate subsequent machine-learning training operations based on the user-related sensor data without disclosing the identity of an associated user.

Related Art

Recently developed machine-learning (ML) techniques are presently being applied to sensor data and other types of user-related data obtained from mobile devices and other remote computing platforms through an existing network infrastructure. These ML techniques are proving to be extremely effective in performing various recognition-related tasks, such as speech recognition, facial recognition and user authentication based on the sensor data.

ML systems generally operate by training a model to perform a recognition task based on features extracted from large volumes of user-related data. The ML systems then use the trained model to perform the specific recognition task. However, to effectively perform the recognition task, the model must be trained on a large and diverse set of training data, which ideally includes most of the possible combinations of features that are likely to be encountered during subsequent recognition operations. While assembling such a large and diverse set of training data, it is desirable to include training data associated with a large and diverse population of users. However, this gives rise to privacy concerns because the users are likely to feel uncomfortable about their personal data being exposed during the training process.

Hence, what is needed is a technique for anonymizing user-related sensor data to facilitate subsequent machine-learning training operations based on the user-related sensor data.

SUMMARY

The disclosed embodiments relate to a system that anonymizes sensor data to facilitate machine-learning training operations without disclosing an associated user's identity. During operation, the system receives encrypted sensor data at a gateway server, wherein the encrypted sensor data includes a client identifier corresponding to an associated user or client device. Next, the system moves the encrypted sensor data into a secure enclave. The secure enclave then: decrypts the encrypted sensor data; replaces the client identifier with an anonymized identifier to produce anonymized sensor data; and communicates the anonymized sensor data to a machine-learning system. Finally, the machine-learning system: uses the anonymized sensor data to train a model to perform a recognition operation, and uses the trained model to perform the recognition operation on subsequently received sensor data. Note that sensor data cannot be traced back to the client device or user outside of the secure enclave and the device itself. Also, neither the operator of the system, nor owner of the gateway server has access to the sensor data.

In some embodiments, the sensor data comprises biometric sensor data associated with the user, and the recognition operation involves recognizing the user's identity.

In some embodiments, the encrypted sensor data is received from a mobile client associated with the user. In these embodiments, prior to receiving the encrypted sensor data, the system performs a handshaking operation between the mobile client and the secure enclave to exchange public keys, which facilitates subsequent encrypted communications between the mobile client and the secure enclave.

In some embodiments, after exchanging the public keys, the secure enclave: generates a symmetric key; encrypts the symmetric key with a public key for the mobile client; and communicates the encrypted symmetric key to the mobile client. The mobile client then: uses a private key for the mobile client to decrypt the encrypted symmetric key; uses the symmetric key to encrypt the sensor data, and sends the encrypted sensor data to the gateway server.

In some embodiments, upon receiving a request for a sensitive result from the mobile client, the gateway server forwards the request to the secure enclave. The secure enclave then: uses a client identifier associated with the request to retrieve an associated anonymized identifier; queries the machine-learning system using the anonymized identifier to obtain the sensitive result; encrypts the sensitive result, and then returns the encrypted sensitive result to the gateway server, which returns the encrypted sensitive result to the mobile client.

In some embodiments, while encrypting the sensitive result, the secure enclave: generates a symmetric key; encrypts the symmetric key with a private key for the mobile client; and encrypts the sensitive result with the symmetric key, wherein the encrypted result is returned along with the encrypted symmetric key to the mobile client via the gateway server.

In some embodiments, while replacing the client identifier with the anonymized identifier, the secure enclave uses one of the following to map the client identifier to the anonymized identifier: a translation table within the secure enclave; and a cryptographic hash function performed within the secure enclave.

In some embodiments, the secure enclave comprises a separate processor and an associated memory, which are separate from the server, and which are configured to store keys and sensitive data so that the server cannot directly access the keys and sensitive data.

In some embodiments, the sensor data includes data obtained from one or more of the following types of sensors in a client device associated with the user: an accelerometer; a touchscreen; a gyroscope; an inertial sensor; an ambient light sensor; an image sensor; a camera; a temperature sensor; a barometric-pressure sensor; a cellular radio signal strength sensor; a Bluetooth radio signal strength sensor; a near-field communication (NFC) sensor; a network-proximity sensor; an infrared sensor; a magnetometer; a battery sensor; a force-touch measurement sensor; a multi-touch measurement sensor; a sensor in a mouse; a sensor in a trackpad; and a keyboard-timing sensor.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Privacy-Preserving System

Figure 1:
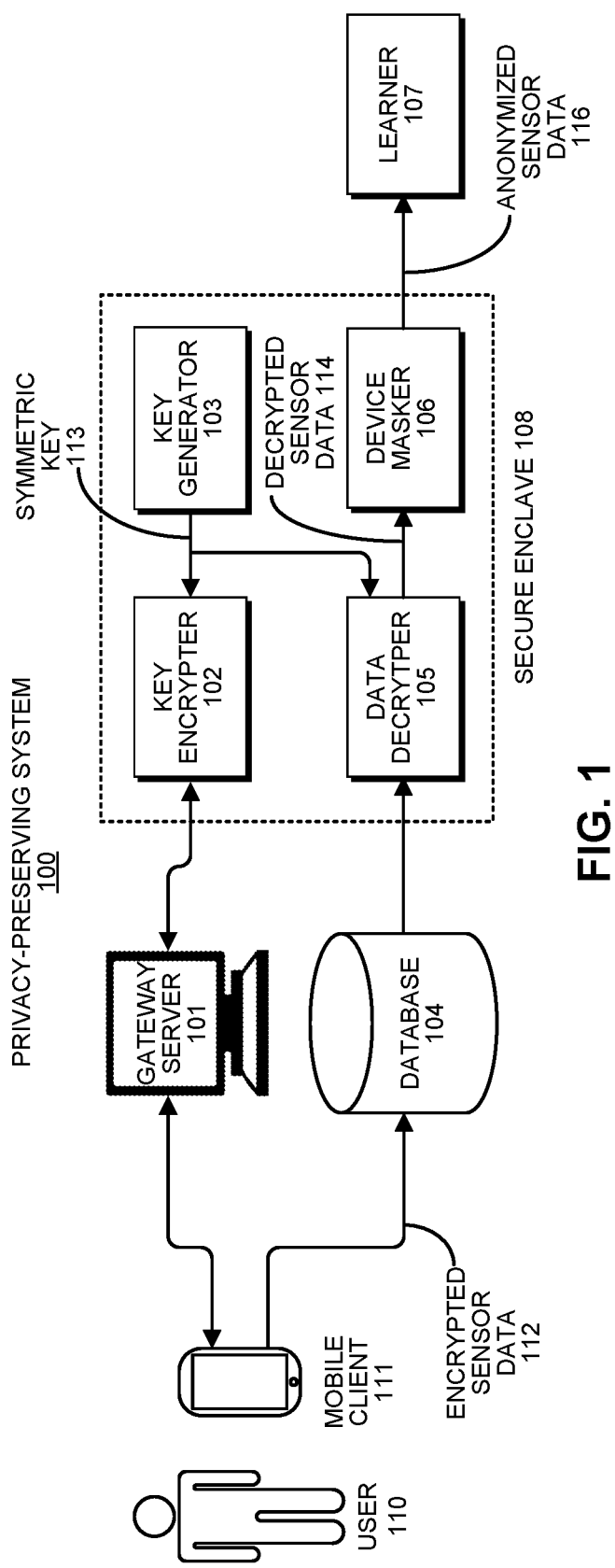
FIG. 1 illustrates a privacy-preserving system in accordance with the disclosed embodiments.

FIG. 1 illustrates a privacy-preserving system 100 in accordance with the disclosed embodiments. As illustrated in FIG. 1, a user 110 operates a mobile client 111, which periodically sends encrypted sensor data 112 to a database 104. Note that mobile client 111 can generally include any type of mobile (or non-mobile) computing device that can be operated by a user, and can generate sensor data. For example, mobile client 111 can include a smartphone, a wearable activity tracker, a medical device, a tablet computer, a laptop computer, or a desktop computer. The sensor data can generally include any type of data that can be generated by physical sensors or computing elements within mobile client 111.

Next, the encrypted sensor data 112 from database 104 feeds into a secure enclave 108, which hosts various functional modules, such as a key encrypter 102, a key generator 103, a data decrypter 105 and a device masker 106. Secure enclave 108 (also called a "secure element") can generally include any type of trusted execution environment (TEE), which is separated from a regular central-processing unit (CPU) of a computer system. Secure enclave 108 can be implemented with technologies such as Intel SGX™ or ARM TrustZone™, or any other secure container technology, and can either be located on the same limited interface to call functions inside of it, and only calls learner 107 outside of it. Also, any memory and code running inside the enclave cannot be read or written, even by the highest permission user of the system, the system author, or the owner of the system Within secure enclave 108, encrypted sensor data 112 feeds through data decrypter 105, which decrypts encrypted sensor data 112 to produce decrypted sensor data 114. Decrypted sensor data 114 feeds into device masker 106, which replaces any client identifiers (or user identifiers) within the decrypted sensor data 114 with corresponding anonymized identifiers to produce anonymized sensor data 116, which is communicated outside of secure enclave 108 to learner 107. Note that learner 107 can generally include any type of system (such as a machine-learning system), which uses the anonymized sensor data 116 to train a model to perform a recognition operation, and then uses the trained model to perform the recognition operation on subsequently received sensor data.

Key encrypter 102 within secure enclave 108 is used to encrypt various encryption keys that are communicated with mobile client 111 through a gateway server 101. This key encryption process is facilitated by a key generator 103, which can generate a symmetric key 113 to be used by key encrypter 102 and data decrypter 105. This key encryption process is described in more detail below.

Handshaking Process

Figure 2:
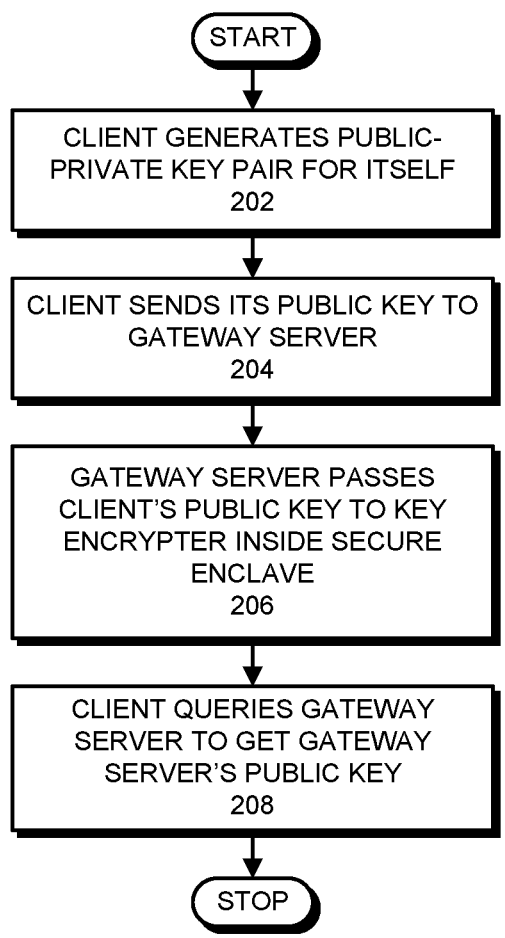
FIG. 2 presents a flow chart illustrating the initial handshaking process in accordance with the disclosed embodiments.

FIG. 2 presents a flow chart illustrating an initial handshaking process, which takes place before any data transfer operations, in accordance with the disclosed embodiments. During this initial handshaking operation, mobile client 111 (also referred to as "client 111") generates a public-private key pair for itself (step 202). (This can involve using RSA, EDSA or any other public key-private key encryption technique.) Next, client 111 sends its private key to gateway server 101 (step 204). Gateway server 101 then passes client 111's public key to key encrypter 102 within secure enclave 108 (step 206). Client 111 also queries gateway server 101 to obtain gateway server 101's public key (or shared secret) (step 208).

Anonymizing Process

Figure 3:
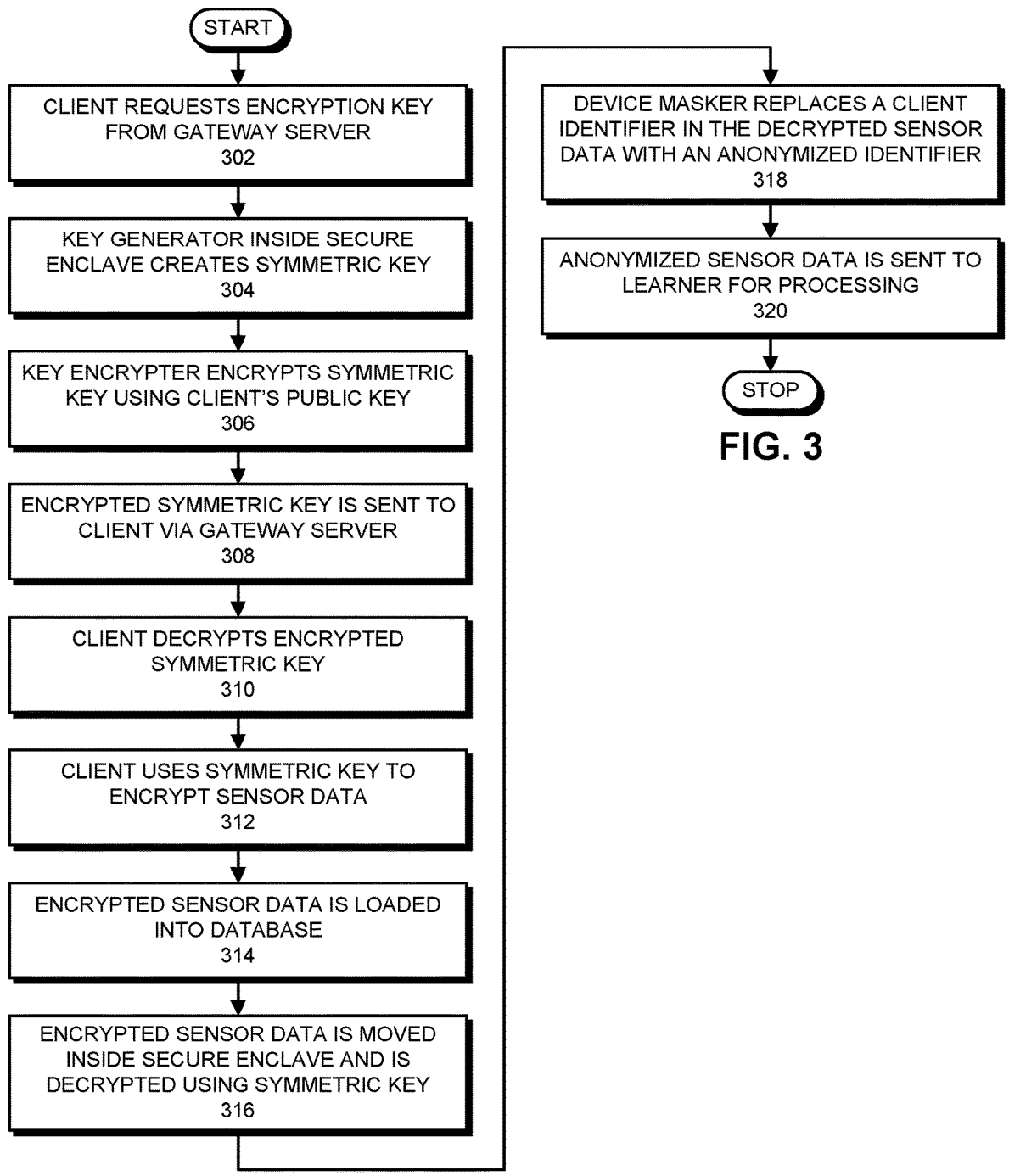
FIG. 3 presents a flow chart illustrating the process of anonymizing sensor data in accordance with the disclosed embodiments.

FIG. 3 presents a flow chart illustrating the process of anonymizing sensor data in accordance with the disclosed embodiments. First, client 111 requests an encryption key (to be used in encrypting the sensor data) from gateway server 101 (step 302). Next, key generator 103 inside secure enclave 108 creates a symmetric key 113 (step 304). Then, key encrypter 102 encrypts symmetric key 113 using client 111's public key (step 306). Next, the encrypted symmetric key is sent to client 111 via gateway server 101 (step 308). Client 111 then decrypts the encrypted symmetric key (step 310), and uses symmetric key 113 to encrypt sensor data 112 (step 312). Next, the encrypted sensor data 112 is loaded into database 104 (step 314). Then, the encrypted sensor data 112 is moved inside secure enclave 108 and is decrypted using symmetric key 113 (step 316). Device masker 106 then replaces a client identifier in the decrypted sensor data 114 with an anonymized identifier (step 318). (Note that the anonymized identifier can be generated, for example, by using a hash table to map the client identifier to a random string.) Finally, the anonymized sensor data 116 is sent to learner 107 for processing (step 320). As mentioned above, learner 107 can use the anonymized sensor data 116 to train a model to perform a recognition operation, and can then use the trained model to perform the recognition operation on subsequently received sensor data.

In some embodiments, the system additionally performs one or more of the following operations to guard against traffic-analysis techniques or other techniques for deanonymizing data: buffering sensor data from multiple encrypted data sources within the secure element and returning the sensor data in a randomized order; adding synthetic or dummy data to the anonymized sensor data (including padding data sizes) to increase a difficulty of correlating the sensor data with the anonymized sensor data; combining multiple secure enclaves in an Onion routing system to guard against traffic-analysis techniques; and allowing the client to bundle multiple payloads in a Garlic routing system to guard against traffic-analysis techniques. For a description of the Onion routing technique, please see Reed M. G., Sylverson P. F., Goldschlag D. M. (1998) "Anonymous connections and onion routing." IEEE Journal on Selected Areas in Communications, 16(4):482-494. For a description of the Garlic routing system, please see https://en.wikipedia.org/wiki/Garlic_routing.

In some embodiments, the system performs one or more of the following additional transformations on the sensor data within the secure enclave to produce the anonymized sensor data: adding noise to the sensor data; quantizing the sensor data; using techniques from k-anonymization to increase a difficulty of deanonymizing the sensor data; and using techniques from differential privacy to increase a difficulty of deanonymizing the sensor data.

Process of Returning a Sensitive Result

Figure 4:
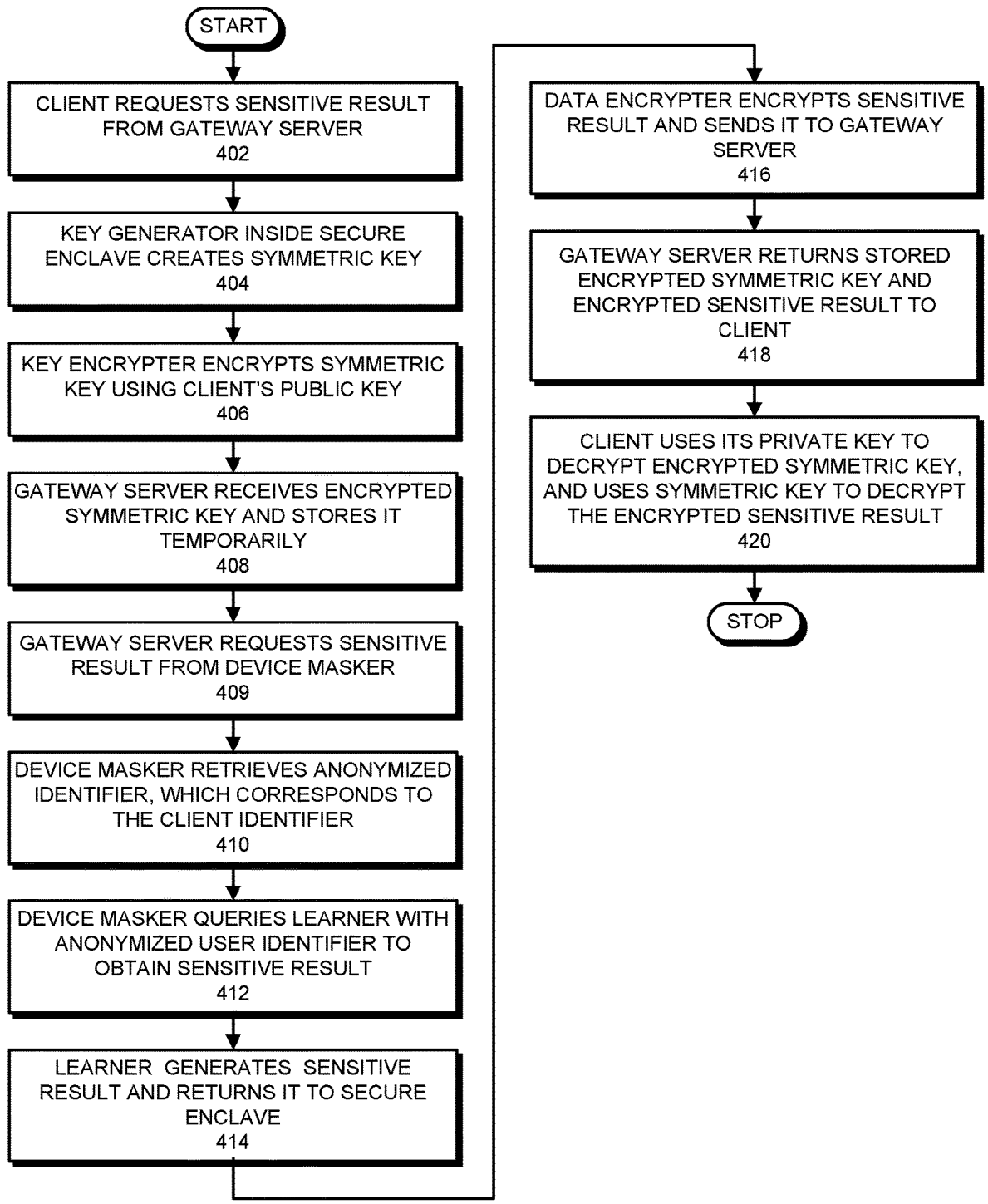
FIG. 4 presents a flow chart illustrating the process of returning a sensitive result to the client in accordance with the disclosed embodiments.

FIG. 4 presents a flow chart illustrating the process of returning a sensitive result to the client in accordance with the disclosed embodiments. First, client 111 requests a sensitive result from gateway server 101 (step 402). Next, key generator 103 within secure enclave 108 creates a symmetric key 113 (step 404). Key encrypter 102 then encrypts symmetric key 113 using client 111's public key (step 406). Then, gateway server 101 receives the encrypted symmetric key and stores it temporarily (step 408).

Next, gateway server 101 requests the sensitive result from device masker 106 (step 409). Note that this request includes an identifier for the client. Then, device masker 106 retrieves the anonymized identifier, which corresponds to the client identifier (step 410). Then, device masker 106 queries learner 107 with the anonymized identifier to obtain the sensitive result (step 412). In response, learner 107 generates the sensitive result and returns it to secure enclave 108 (step 414). Then, data encrypter 105 encrypts the sensitive result (using encryption key 113) and sends it to gateway server 101 (step 416). Gateway server 101 then returns the stored encrypted symmetric key and sends the encrypted sensitive result to client 111 (step 418). Finally, client 111 uses its private key to decrypt the encrypted symmetric key and then uses symmetric key 113 to decrypt the encrypted sensitive result (step 420).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for anonymizing sensor data to facilitate machine-learning training operations without disclosing an associated user's identity, comprising:
   receiving encrypted sensor data at a gateway server, wherein the encrypted sensor data includes a client identifier corresponding to an associated user or client device;
   moving the encrypted sensor data into a secure enclave;
   within the secure enclave,
      decrypting the encrypted sensor data, and
      replacing the client identifier with an anonymized identifier to produce anonymized sensor data;
   communicating the anonymized sensor data to a machine-learning system; and
   within the machine-learning system,
      using the anonymized sensor data to train a model to perform a recognition operation, and
      using the trained model to perform the recognition operation on subsequently received sensor data.

2. The method of claim 1,
   wherein the sensor data comprises biometric sensor data associated with the user; and
   wherein the recognition operation involves recognizing the user's identity.

3. The method of claim 1,
   wherein the encrypted sensor data is received from a mobile client associated with the user; and
   wherein prior to receiving the encrypted sensor data, the method further comprises performing a handshaking operation between the mobile client and the secure enclave to exchange public keys, which facilitates subsequent encrypted communications between the mobile client and the secure enclave.

4. The method of claim 3, wherein after exchanging the public keys, the method further comprises:
   within the secure enclave,
      generating a symmetric key,
      encrypting the symmetric key with a public key for the mobile client, and
      communicating the encrypted symmetric key to the mobile client; and
   within the mobile client,
      using a private key for the mobile client to decrypt the encrypted symmetric key,
      using the symmetric key to encrypt the sensor data, and
      sending the encrypted sensor data to the gateway server.

5. The method of claim 3, wherein the method further comprises:
   within the gateway server, receiving a request for a sensitive result from the mobile client, and forwarding the request to the secure enclave;

within the secure enclave, using a client identifier associated with the request to retrieve an associated anonymized identifier, querying the machine-learning system using the anonymized identifier to obtain the sensitive result, encrypting the sensitive result, and returning the encrypted sensitive result to the gateway server, which returns the encrypted sensitive result to the mobile client.

6. The method of claim 5, wherein encrypting the sensitive result comprises:

generating a symmetric key within the secure enclave;

encrypting the symmetric key with a private key for the mobile client; and encrypting the sensitive result with the symmetric key, wherein the encrypted result is returned along with the encrypted symmetric key to the mobile client via the gateway server.

7. The method of claim 1, wherein replacing the client identifier with the anonymized identifier involves using one of the following to map the client identifier to the anonymized identifier:

a translation table within the secure enclave; and a cryptographic hash function performed within the secure enclave.

8. The method of claim 1, wherein the secure enclave comprises a separate processor and an associated memory, which are separate from the server, and which are configured to store keys and sensitive data so that the server cannot directly access the keys and sensitive data.

9. The method of claim 1, wherein the sensor data includes data obtained from one or more of the following types of sensors in a client device associated with the user:

an accelerometer;
a touchscreen;
a gyroscope;
an inertial sensor;
an ambient light sensor;
an image sensor;
a camera;
a temperature sensor;
a barometric-pressure sensor;
a cellular radio signal strength sensor;
a Bluetooth radio signal strength sensor;
a near-field communication (NFC) sensor;
a network-proximity sensor;
an infrared sensor;
a magnetometer;
a battery sensor;
a force-touch measurement sensor;
a multi-touch measurement sensor;
a sensor in a mouse;
a sensor in a trackpad; and
a keyboard-timing sensor.

10. The method of claim 1, wherein the method further comprises performing one or more of the following operations to guard against traffic-analysis techniques or other techniques for deanonymizing data:

buffering sensor data from multiple encrypted data sources within the secure element and returning the sensor data in a randomized order;

adding synthetic or dummy data to the anonymized sensor data to increase a difficulty of correlating the sensor data with the anonymized sensor data;

combining multiple secure enclaves in an Onion routing system to guard against traffic-analysis techniques; and allowing the client to bundle multiple payloads in a Garlic routing system to guard against traffic-analysis techniques.

11. The method of claim 1, further comprising performing one or more of the following additional transformations on the sensor data within the secure enclave to produce the anonymized sensor data:

adding noise to the sensor data;

quantizing the sensor data;

using techniques from k-anonymization to increase a difficulty of deanonymizing the sensor data; and using techniques from differential privacy to increase a difficulty of deanonymizing the sensor data.

12. A system that anonymizes sensor data to facilitate machine-learning training operations without disclosing an associated user's identity, comprising:

a gateway server, which is configured to:

receive encrypted sensor data, wherein the encrypted sensor data includes a client identifier corresponding to an associated user or client device, and move the encrypted sensor data into a secure enclave;

the secure enclave, which is configured to:

decrypt the encrypted sensor data, replace the client identifier with an anonymized identifier to produce anonymized sensor data, and communicate the anonymized sensor data to a machine-learning system; and the machine-learning system, which is configured to:

use the anonymized sensor data to train a model to perform a recognition operation, and use the trained model to perform the recognition operation on subsequently received sensor data.

13. The system of claim 12, wherein the sensor data comprises biometric sensor data associated with the user; and wherein the recognition operation involves recognizing the user's identity.

14. The system of claim 12, wherein the encrypted sensor data is received from a mobile client associated with the user; and wherein prior to receiving the encrypted sensor data, the secure enclave performs a handshaking operation with the mobile client to exchange public keys, which facilitates subsequent encrypted communications between the mobile client and the secure enclave.

15. The system of claim 14, wherein after exchanging the public keys, the secure enclave is configured to, generate a symmetric key, encrypt the symmetric key with a public key for the mobile client, and communicate the encrypted symmetric key to the mobile client; and the mobile client is configured to, use a private key for the mobile client to decrypt the encrypted symmetric key, use the symmetric key to encrypt the sensor data, and send the encrypted sensor data to the gateway server.

16. The system of claim 14, wherein the gateway server is configured to, receive a request for a sensitive result from the mobile client, and forward the request to the secure enclave; and wherein the secure enclave is configured to, use a client identifier associated with the request to retrieve an associated anonymized identifier,
query the machine-learning system using the anonymized identifier to obtain the sensitive result,
encrypt the sensitive result, and
return the encrypted sensitive result to the gateway server, which returns the encrypted sensitive result to the mobile client.

17. The system of claim 16, wherein while encrypting the sensitive result, the secure enclave is configured to:
generate a symmetric key;
encrypt the symmetric key with a private key for the mobile client; and
encrypt the sensitive result with the symmetric key, wherein the encrypted result is returned along with the encrypted symmetric key to the mobile client via the gateway server.

18. The system of claim 12, wherein while replacing the client identifier with the anonymized identifier, the secure enclave is configured to use one of the following to map the client identifier to the anonymized identifier:
a translation table within the secure enclave; and
a cryptographic hash function performed within the secure enclave.

19. The system of claim 12, wherein the secure enclave comprises a separate processor and an associated memory, which are separate from the server, and which are configured to store keys and sensitive data so that the server cannot directly access the keys and sensitive data.

20. The system of claim 12, wherein the secure enclave is configured to perform one or more of the following additional operations to guard against traffic-analysis techniques or other techniques for deanonymizing data:
buffering sensor data from multiple encrypted data sources within the secure element and returning the sensor data in a randomized order;
adding synthetic or dummy data to the anonymized sensor data to increase a difficulty of correlating the sensor data with the anonymized sensor data;
combining multiple secure enclaves in an Onion routing system to guard against traffic-analysis techniques; and
allowing the client to bundle multiple payloads in a Garlic routing system to guard against traffic-analysis techniques.

21. The system of claim 12, wherein the secure enclave is configured to perform one or more of the following additional transformations on the sensor data to produce the anonymized sensor data:
adding noise to the sensor data;
quantizing the sensor data;
using techniques from k-anonymization to increase a difficulty of deanonymizing the sensor data; and
using techniques from differential privacy to increase a difficulty of deanonymizing the sensor data.

22. A non-transitory computer-readable storage medium storing instructions that when executed by a computer cause the computer to perform a method for anonymizing sensor data to facilitate machine-learning training operations without disclosing an associated user's identity, the method comprising:
receiving encrypted sensor data at a gateway server, wherein the encrypted sensor data includes a client identifier corresponding to an associated user or client device;
moving the encrypted sensor data into a secure enclave;
within the secure enclave,
decrypting the encrypted sensor data, and
replacing the client identifier with an anonymized identifier to produce anonymized sensor data;
communicating the anonymized sensor data to a machine-learning system; and
within the machine-learning system,
using the anonymized sensor data to train a model to perform a recognition operation, and
using the trained model to perform the recognition operation on subsequently received sensor data.

23. The non-transitory computer-readable storage medium of claim 22,
wherein the sensor data comprises biometric sensor data associated with the user; and
wherein the recognition operation involves recognizing the user's identity.

24. The non-transitory computer-readable storage medium of claim 22,
wherein the encrypted sensor data is received from a mobile client associated with the user; and
wherein prior to receiving the encrypted sensor data, the method further comprises performing a handshaking operation between the mobile client and the secure enclave to exchange public keys, which facilitates subsequent encrypted communications between the mobile client and the secure enclave.

25. The non-transitory computer-readable storage medium of claim 24, wherein after exchanging the public keys, the method further comprises:
within the secure enclave,
generating a symmetric key,
encrypting the symmetric key with a public key for the mobile client, and
communicating the encrypted symmetric key to the mobile client; and
within the mobile client,
using a private key for the mobile client to decrypt the encrypted symmetric key,
using the symmetric key to encrypt the sensor data, and
sending the encrypted sensor data to the gateway server.

26. The non-transitory computer-readable storage medium of claim 24, wherein the method further comprises:
within the gateway server,
receiving a request for a sensitive result from the mobile client, and
forwarding the request to the secure enclave;
within the secure enclave,
using a client identifier associated with the request to retrieve an associated anonymized identifier,
querying the machine-learning system using the anonymized identifier to obtain the sensitive result,
encrypting the sensitive result, and
returning the encrypted sensitive result to the gateway server, which returns the encrypted sensitive result to the mobile client.

27. The non-transitory computer-readable storage medium of claim 26, wherein encrypting the sensitive result comprises:
generating a symmetric key within the secure enclave;
encrypting the symmetric key with a private key for the mobile client; and
encrypting the sensitive result with the symmetric key, wherein the encrypted result is returned along with the encrypted symmetric key to the mobile client via the gateway server.

28. The non-transitory computer-readable storage medium of claim 22, wherein replacing the client identifier with the anonymized identifier involves using one of the following to map the client identifier to the anonymized identifier:
a translation table within the secure enclave; and
a cryptographic hash function performed within the secure enclave.

29. The non-transitory computer-readable storage medium of claim 22, wherein the secure enclave comprises a separate processor and an associated memory, which are separate from the server, and which are configured to store keys and sensitive data so that the server cannot directly access the keys and sensitive data.

30. The non-transitory computer-readable storage medium of claim 22, wherein the method further comprises performing one or more of the following operations to guard against traffic-analysis techniques or other techniques for deanonymizing data:
buffering sensor data from multiple encrypted data sources within the secure element and returning the sensor data in a randomized order;
adding synthetic or dummy data to the anonymized sensor data to increase a difficulty of correlating the sensor data with the anonymized sensor data;
combining multiple secure enclaves in an Onion routing system to guard against traffic-analysis techniques; and
allowing the client to bundle multiple payloads in a Garlic routing system to guard against traffic-analysis techniques.

31. The non-transitory computer-readable storage medium of claim 22, wherein the method further comprises performing one or more of the following additional transformations on the sensor data within the secure enclave to produce the anonymized sensor data:
adding noise to the sensor data;
quantizing the sensor data;
using techniques from k-anonymization to increase a difficulty of deanonymizing the sensor data; and
using techniques from differential privacy to increase a difficulty of deanonymizing the sensor data.

* * * * *